United States Patent [19]
Igarashi

[11] Patent Number: 5,902,992
[45] Date of Patent: May 11, 1999

[54] CARD CONTACTING CONSTRUCTION

[75] Inventor: Minoru Igarashi, Yotsukaido, Japan

[73] Assignee: Yamaichi Electronics Co., Ltd., Tokyo, Japan

[21] Appl. No.: 08/963,748

[22] Filed: Nov. 4, 1997

[30] Foreign Application Priority Data

Nov. 7, 1996 [JP] Japan ................................. 8-295404

[51] Int. Cl.$^6$ ................................................. G06K 19/06
[52] U.S. Cl. .......................................... 235/492; 235/486
[58] Field of Search ............................. 235/492, 486, 235/485, 483

[56] References Cited

U.S. PATENT DOCUMENTS

| | | | |
|---|---|---|---|
| 4,743,746 | 5/1988 | Murschall et al. | 235/486 |
| 4,839,509 | 6/1989 | Yasuma et al. | 235/483 |
| 4,931,622 | 6/1990 | Ohtsuki et al. | 235/486 |
| 4,940,418 | 7/1990 | Shimizu et al. | 235/486 |
| 5,012,078 | 4/1991 | Pernet | 235/483 |
| 5,332,890 | 7/1994 | Kitahara | 235/492 |
| 5,380,997 | 1/1995 | Hania et al. | 235/483 |

*Primary Examiner*—Donald Hajec
*Assistant Examiner*—Diane I. Lee
*Attorney, Agent, or Firm*—Wenderoth, Lind & Ponack, L.L.P.

[57] ABSTRACT

A card contacting construction includes a floating member capable of movement upwardly and downwardly in a generally vertical direction with respect to a direction of insertion of a card. The floating member is lowered in the generally vertical direction by being pushed by the card when the card is inserted contacts are arranged so as to be contacted under pressure with electrode pads which are arranged on a lower surface of the card, and the contacts are pushed down by the lowering floating member, so as to shift downwardly to preload an upwardly-directing resilient force.

10 Claims, 4 Drawing Sheets

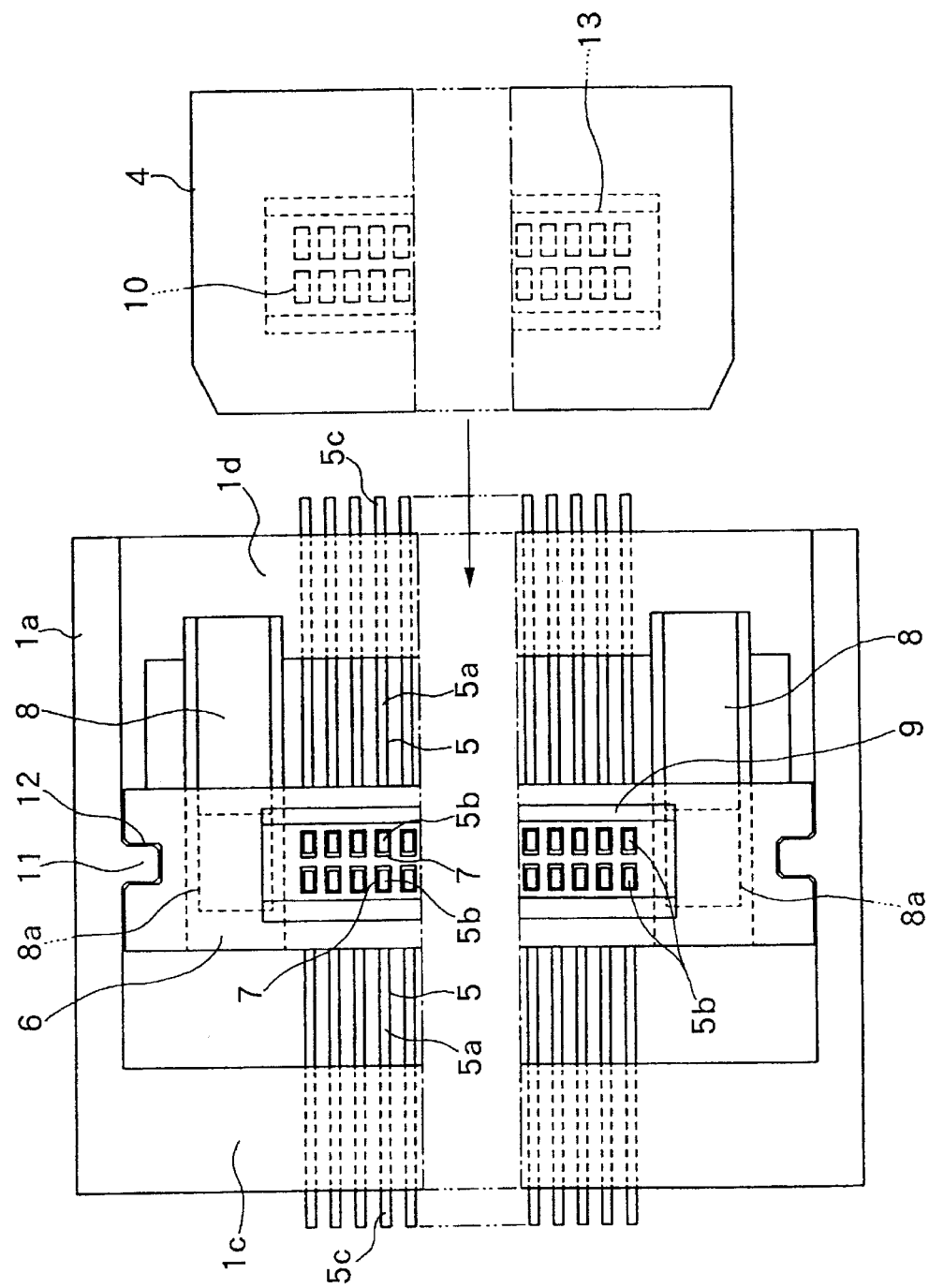

CARD CONTACTING CONSTRUCTION

BACKGROUND OF THE INVENTION

1. Field of the Invention

This invention relates to an improvement of a card contacting construction, in which a card, such as an IC memory card, or the like, is inserted into a card connector so that electrode pads of the card will come into pressure contact with contacts of a card connector.

2. Related Art

Conventionally, a card, such as an IC card, or the like, is inserted into a user's card connector, and then the user's card connector with the card thus inserted therein, is in turn inserted into an inlet port of an electronic device, such as a personal computer, or the like, or a user's card connector is pre-installed within an inlet port of such an electronic device so that when the card is inserted into the inlet port, the card will come into contact with a data processing circuit of the electronic device through the card connector.

The electrode pads arranged on the lower surface of the card and the contacts provided within the card connector and adapted to contact the card, can have a contacting construction as shown in FIGS. 1(A)–1(B) or 2(A)–2(B).

The card contacting construction of FIGS. 1(A)–1(B) is designed such that a contact portion 2 provided on a free end of each card contacting contact 1 is pressed at it's side surface by a front edge of a card 3 to cause the contact portion 2 to be shifted to a lower surface of the card or card receiving case 3, so that the contact portion 2 will come into pressure contact with a corresponding one of the electrode pads 4 arranged on the lower surface of the card or card receiving case 3.

This conventional arrangement, however, has the following shortcomings. In order to obtain a sufficient contacting pressure between the electrode pad 4 of the card 3 and the contact portion 2 of the card contacting contact 1, a projecting distance H of the contact portion 2 with respect to the card 3 is required to be as large as possible and a downward shifting quantity of the contact portion 2 is required to be as large as possible. However, if the projecting distance H is designed to be too large in order to obtain a sufficient contacting pressure, the contact portion 2 and the contact 1 will be deformed when the card 3 hits the side surface of the contact portion 2 of the contact 1, and in addition, a card inserting resistance will be increased.

Therefore, an acceptable projecting distance H of the contact portion 2 is limited, and a required contacting pressure is difficult to obtain.

The card contacting construction of FIGS. 2(A)–2(B) is designed to include a slide plate S capable of sliding in accordance with insertion of the card 3, and the slide plate 5 is provided on a lower surface thereof with contact guide grooves 6 extending in a direction of insertion of the card 3. Contact portions 2 of card contacting contacts 1 are, before insertion of the card 3, disposed in a standby position where the contact portions 2 are contacted under pressure with bottom surfaces of the contact guide grooves 6 to preload resilient force, respectively. The contact portions 2 of the card contacting contacts 1 are, during the course of insertion of the card 3, caused to slide on the bottom surfaces of the contact guide grooves 6 of the slide plate 5 and are resiliently restored upwardly at openings 7 formed in first ends of the grooves 6, respectively, so that they will be contacted under pressure with electrode pads 4 provided on a lower surface of the card 3.

This conventional card contacting construction, however, has the following shortcomings. Since the contact portions 2 of the card contacting contacts 1 are required to be held in a standby position where the contact portions 2 are normally contacted under pressure with the bottom surfaces of the contact guide grooves 6 to preload resilient force, respectively, the contacts 2 are susceptible to fatigue and resilient deficiency, in their resiliency. In addition, the contact portions 2 are held in rubbing relation with the bottom surfaces of the contact guide grooves 6 for a long time, respectively, thereby degrading the plating on the surfaces of the contact portions 2 in an early stage of their service life, with the results that the reliability is decreased.

The present invention has been accomplished under the above-mentioned circumstances.

SUMMARY OF THE INVENTION

It is, therefore, an object of the present invention to provide a card contacting construction capable of providing an appropriate contacting pressure while improving the above-mentioned problems inherent in the conventional devices.

A card contacting construction according to the present invention comprises a floating member capable of movement upwardly and downwardly in a generally vertical direction with respect to a direction of insertion of a card. The floating member is lowered in the generally vertical direction by being pushed by the card when the card is inserted. Contacts are arranged so as to be contacted under pressure with electrode pads which are arranged on a lower surface of the card, and the contacts are pushed down by the lowering floating member, so as to shift downwardly to preload an upwardly-directed resilient force.

By virtue of the above-mentioned arrangement, as shown in FIGS. 1(A)–1(B), a required contacting pressure can be obtained without overly increasing a projecting distance of the contact portion of each contact with respect to the card as means for increasing a contacting pressure. Accordingly, there is no fear that the contacts will be deformed by insertion of the card.

In addition, as shown in FIGS. 2(A)–2(B), a required contacting pressure can be obtained without holding the contact portions of the card contacting contacts in a standby position where the contact portions are contacted under pressure with bottom surfaces of the contact guide grooves to preload resilient force. Accordingly, the problem of fatigue which the card contacting contacts in the contacting construction of FIGS. 2(A)–2(B) will have, can be obviated effectively.

Furthermore, the floating member includes an inclined guide surface upwardly inclined in the direction of insertion of the card, the inclination guide surface being pressed by a front edge of the card when the card is inserted. Accordingly, the insertion of the card and the lowering of the floating member can be performed smoothly.

Moreover the floating member is shouldered by the card contacting contacts or by other spring means. Accordingly, the floating member is lowered while flexing the contacts or the other spring means against resiliency thereof and raised by the restoring force thereof The floating member can be shouldered by both the contacts and the other spring means.

The contact portions of the card contacting contacts may be designed to come into contact under pressure with the electrode pads immediately before the completion of insertion of the card, and slide on surfaces of the electrode pads during the course of insertion of the card. Owing to this arrangement, a wiping action can be obtained.

The above and other objects, characteristic features and advantages of the present invention will become more apparent to those skilled in the art by the following description of the preferred embodiment of the invention, as illustrated in the accompanying drawings.

BRIEF DESCRIPTION OF THE DRAWINGS

FIG. 3 is a plan view showing a card contacting connector, but with a top plate portion thereof removed therefrom, according to one embodiment of the present invention.

DETAILED DESCRIPTION OF THE EMBODIMENT

Figure 1A:
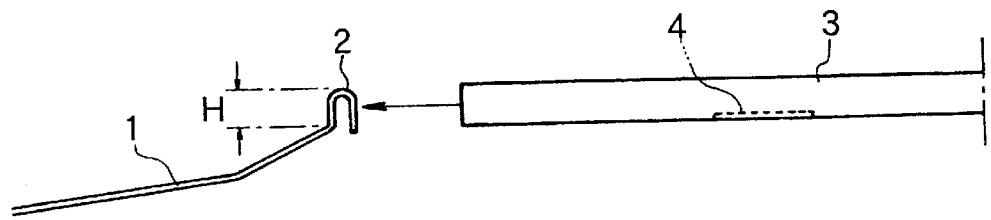
FIGS. 1(A)–1(B) are side views showing a conventional contacting construction between a card and a contact comparable with the present invention.
Figure 1B:
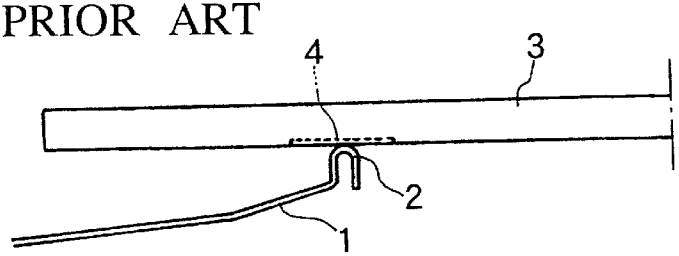

One embodiment of the present invention will now be described in detail with reference to FIGS. 3 and 4(A)–4(F) of the accompanying drawings. Reference numerals used here are unrelated to those of FIGS. 1(A)–1(B) and 2(A)–2 (B).

In FIGS. 3 and 4(A)–4(F), reference numeral 1 denotes a connector body comprising a flat and square insulative housing. The connector body 1 includes a card insertion chamber 2 formed between a bottom plate portion 1a and a top plate portion 1b. One end of the card insertion chamber 2 is open at a front end face of the connector body 1 to form a card inlet port 3.

The connector body 1 includes within the card insertion chamber 2 a plurality of contacts 5 which can contact a card 4 inserted through the card inlet port 3, and a floating member 6 capable of movement upwardly and downwardly in accordance with insertion and withdrawal of the card 4.

The card contacting contacts S are each formed of a conductive elongated piece obtained by blanking a sheet metal and bending the same. Each contact 5 includes, on one end thereof, a resilient elongated piece 5a extending upwardly from a basal end towards a free end thereof. The contact 5 further includes a contact portion 5b projecting upwardly from the free end of the resilient elongated piece 5a, and a terminal piece 5c provided on the other end and adapted to be connected to a data processing circuit within an electronic device.

A plurality of contacts 5 are arranged in array in a direction perpendicular to an insertion/withdrawal direction of the card 4 such that each of the contacts 5 extends in the insertion/withdrawal direction of the card 4. The illustrated example includes a first array of card contacting contacts and a second array of card contacting contacts. Each contact 5 of the first array is fixed in the vicinity of its basal end to a rear wall 1c of the contact body 1. The resilient elongated piece 5a extends towards the interior of the card insertion chamber 2 from the fixed portion.

That is, the resilient elongated piece 5a of each card contacting contact 5 of the first array extends in an upwardly inclined fashion forwardly (i.e. inwardly) from the rear wall 1c (fixed portion) in a card withdrawal direction (i.e. in a direction opposite to a card insertion direction within the card insertion chamber 2, such that the contact portion 5b provided on the free end is disposed on an insertion path of the card 4 and the terminal piece 5c extends through the rear wall 1c from the fixed portion and projects outwardly.

Similarly, each card contacting contact 5 of the second array is fixed at area in the vicinity of its basal end to a front wall 1d of the contact body 1 and extends towards the interior of the card insertion chamber 2 from the fixed portion. That is, the resilient elongated piece 5a of each card contacting contact 5 of the second array extends in an upwardly inclined fashion rearwardly (i.e. inwardly) from the front wall 1d within the card insertion chamber 2, such that the contact portion 5b provided on the free end is disposed on an insertion path of the card 4 and the terminal piece 5c projects outwardly from the fixed portion (front wall 1d).

As mentioned above, the resilient elongated pieces 5a of the card contacting contacts 5 of the first array and the resilient elongated pieces 5a of the card contacting contacts 5 of the second array extend at their in opposite directions with respect to each other, such that the contact portions 5b of the card contacting contacts of the first array and the contact portions 5b of the card contacting contact 5 of the second array are opposite to each other in the card insertion/withdraw direction, namely, on the insertion path of the card 4. The floating member 6 is disposed in this region where the contact portions 5b of the card contacting contacts 5 of the first and second arrays are placed opposite to each other.

The floating member 6 is formed of a rectangular insulative plate which extends in a direction perpendicular to the card insertion/withdrawal direction. The floating member 6 includes a plurality of contact restricting apertures 7 arranged in array in a direction perpendicular to the card insertion/withdrawal direction. Each contact restricting aperture 7 vertically extends all the way through the floating member 6.

The illustrated example includes a first array of contact restricting apertures and a second array of contact restricting apertures arranged in such manner as to correspond to the arrangement of the arrays of contacts. The contact portion 5b of each card contacting contact 5 of the first array is inserted from below, into the corresponding contact restricting aperture 7 of the first array, such that a top portion of the contact portion 5b projects through the restricting aperture 7 and above the top surface of the floating member 6.

Figure 4A:
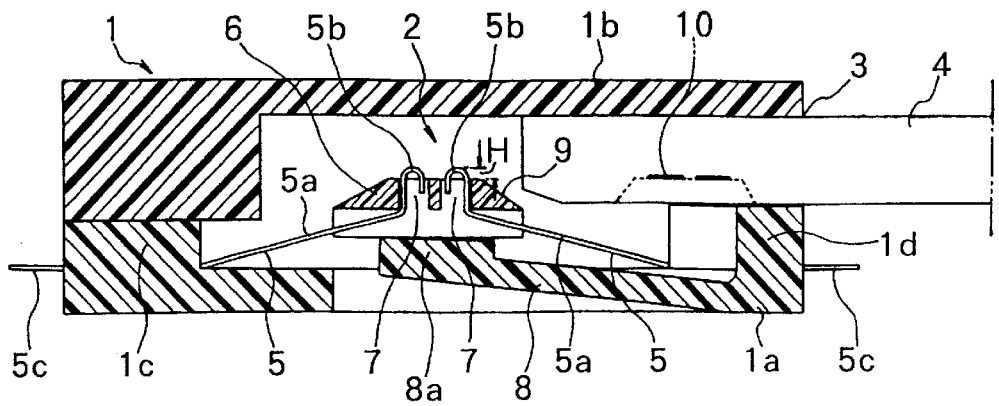
FIGS. 4(A)–4(F) are sectional views of the above-mentioned card contacting connector for explaining the actions of a floating member and contacts sequentially when a card is inserted into the connector.

Similarly, the contact portion 5b of each card contacting contact 5 of the second array is inserted from below, into the corresponding contact restricting aperture 7, such that the top portion of the contact portion 5b projects through the restricting aperture 7 and above the top surface of the floating member 6. In FIG. 4(A), reference character H denotes a projecting distance of the contact portion 5b above the top surface of the floating member 6.

The floating member 6 is supported or shouldered by the card contacting contacts 5, or by spring means other than the contacts.

In the illustrated example, elongated resilient support arms 8, extending in the card insertion direction, are formed integrally with the bottom plate portion 1a of the connector body 1, and a lower surface of the floating member 6 is shouldered by support seats 8a provided on the free ends of the resilient support arms 8.

The support seats 8a and the resilient support arms 8 are connected to the bottom plate portion 1a in a cantilever fashion, such that they can resiliently shift upwardly and downwardly about the connecting portion. Therefore, the floating member 6 shouldered by the support seats 8a is lowered while causing the resilient support arms 8 to shift downwardly against their resiliency. Thus, the floating member 6 can be raised upwardly by the restoring force of the arms 8.

The resilient elongated piece 5a of each card contacting contact 5 is, when the floating member 6 is lowered, pushed by the floating member 6 so as to be resiliently shifted downwardly together with the contact portion 5b, thereby preloading an upward resilient force. That is, the contact portion 5b is resiliently shifted in a direction generally perpendicular direction to the of insertion of the card 4 when the floating member 6 is lowered.

As previously mentioned, the contact portion 5b upwardly projecting from the free end of the resilient elongated piece 5a of each card contacting contact 5 is inserted into the corresponding contact restricting aperture 7 of the floating member 6. The contact portion 5b can be resiliently shifted downwardly by pushing a connecting portion between the contact portion 5b and the resilient elongated portion 5a with a wall defining the contact restricting aperture 7.

If the floating member 6 is shouldered by the card contacting contacts 5, the floating member 6 can be shouldered, for example, by the connecting portions between the contact portions 5b and the resilient elongated portions 5a without the provision of the resilient support arms 8 and the support seats 8a.

In that case, the contacts 5 also serve as the spring means for resiliently supporting the floating member 6. When lowering, the floating member 6 shouldered by the card contacting contacts 5 presses the contacts 5, so that the resilient elongated pieces 5a and the contact portions 5b are also resiliently shifted downwardly to preload an upward resilient force.

It is also accepted that the floating member 6 is shouldered by either or both of spring means such as the resilient support arms 8, or the card contacting contacts 5.

When the card 4 is inserted, the floating member 6 is pressed by the card 4 so as to be lowered in a direction generally perpendicular to the card insertion direction, thereby preloading an upward resilient force.

The floating member 6 includes a pressure receiving portion formed on a front side surface on the card insertion side thereof, which pressure receiving portion is pressed by a front edge of the card 4. The pressure receiving portion is formed by a guide surface 9 which is rearwardly and upwardly inclined in the card insertion direction. During the course of insertion of the card 4, the front edge of the card 4 contacts the inclined guide surface 9 and then, the card 4 is linearly smoothly inserted while sliding on the inclined guide surface 9.

The inclined guide surface 9 favorably generates component force for pressing the floating member 6 downwardly when the card 4 is linearly inserted with its front edge being slid on the surface of the guide surface 9. As a consequence, the floating member 6 is reliably lowered.

It is also accepted that the inclined guide surfaces 9 are each formed on the front and rear side surfaces of the floating member 6, and the floating member 6 is disposed such that either the front or rear inclined guide surface 9 is placed opposite the card 4. In order to facilitate a smooth upward and downward motion of the floating member 6, guide mechanisms such as a projections 11 and grooves 12 are formed at opposite ends of the floating member 6.

Referring now to FIGS. 4(A)–4(F), the actions of the floating member 6 and the contacts 5 in accordance with insertion of the card 4 will be described in order to enable a better understanding of the construction of the present invention.

Figure 4B:
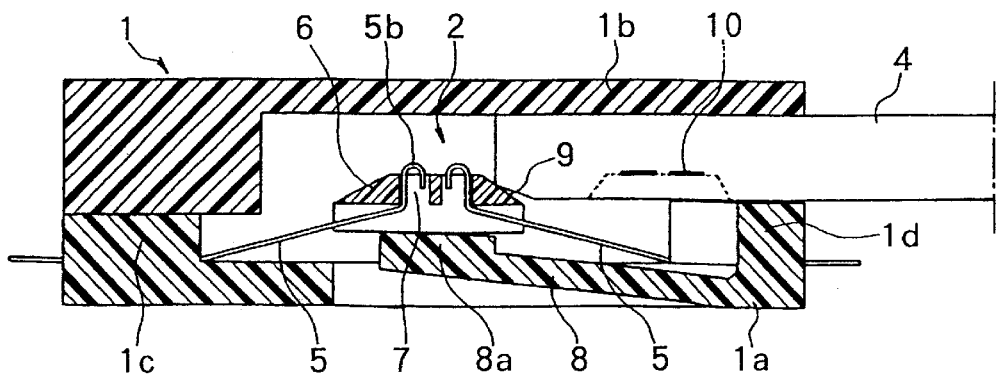

As shown in FIGS. 4(A)–4(B), when the card 4 is inserted into the card insertion chamber 2 through the card inlet port 3 of the connector body 1, the front edge of the card 4 comes into contact with the inclined guide surface 9 which forms the pressure receiving portion of the floating member 6.

Figure 4C:
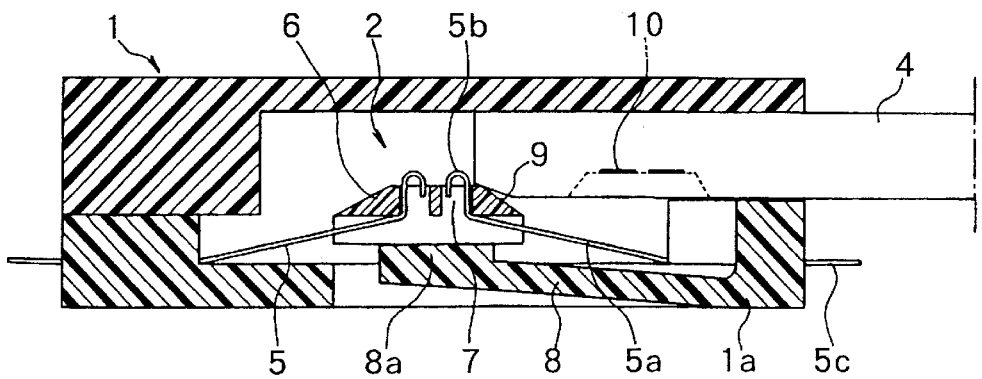

As shown in FIGS. 4(B)–4(C), the card 4 is continuously inserted with its front edge being slid on the inclined guide surface 9. At that time, a component force for pressing the floating member 6 downwardly is applied to the floating member 6. By this component force, the floating member 6 is lowered against the resiliency of the resilient support arms 8 and/or the card contacting contacts 5. As a consequence, the card contacting contacts 5 are pressed by the floating member 6 and resiliently shifted downwardly to thereby reload an upward resilient force.

Figure 4D:
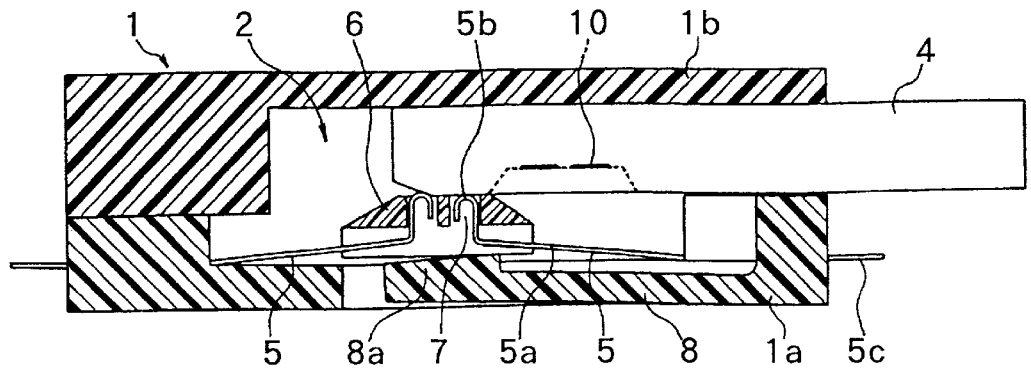

Furthermore, as shown in FIGS. 4(C)–4(D), when the insertion of the card 4 is continued, the card 4 climbs over the floating member 6 while pressing down the floating member 6. Then, the card 4 presses the side (front) surfaces of the contact portions 5b of the card contacting contacts 5 projecting from the top surface of the floating member 6, so that the contact portions 5b are pushed down into the contact restricting apertures 7 against the resiliency of the resilient elongated pieces 5a. By doing so, the card 4 can climb over the contact portions 5b.

As a consequence, the contact portions 5b of the card contacting contacts 5 preload an upward resilient force due to the contacts 5 being pushed down by the floating member 6 and further preload an upward resilient force due to the contact portions 5b themselves being pushed down by the card 4. Thus, an increased upward resilient force is preloaded in the contact portions 5b.

Figure 4E:
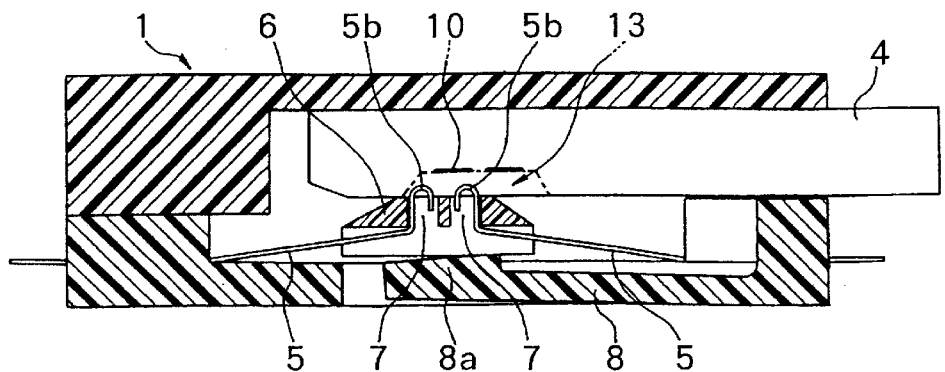
Figure 4F:
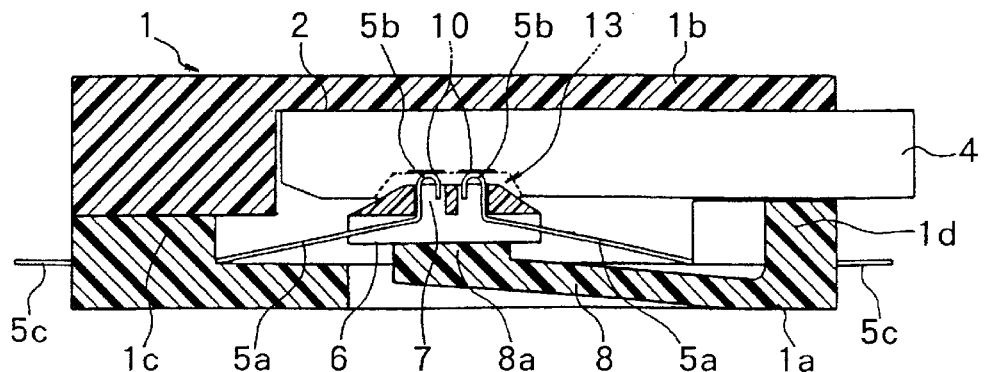

As shown in FIGS. 4(E)–4(F), when the card 4 is inserted fully to the end position, the contact portions 5b of the card contacting contacts 5 are brought into opposing relationship with the electrode pads 10 arranged on the lower surface of the card 4 and are contacted under pressure with the electrode pads 10 by the upward resilient force.

In the illustrated example, the card 4 has in its lower surface recesses 13 and the electrode pads 10 are arranged on inner bottom surfaces of the recesses 13. As shown in FIG. 4(F), an upper end of the floating member 6 and the contact portions 5b are engaged in the recesses 13 and contacted under pressure with the electrode pads 10.

The card 4 is an IC memory card containing an IC chip, or the like. The electrode pads 10 constitute external terminals of the IC chip.

According to the present invention, when the card is inserted, the floating member is lowered to resiliently shift the contacts downwardly so that they each preload an upward resilient force, the projecting distance H of the contact portions pushed down by the card can be minimized while ensuring a required contacting pressure.

Therefore, it is no longer required to unduly increase, as shown in FIG. 1(A), a projecting distance of the contact portions for the purpose of ensuring a sufficient contacting pressure. Thus, the problem of deformation caused by pressure from the card due to an overly increased projecting distance of the contact portions can be obviated.

Figure 2A:
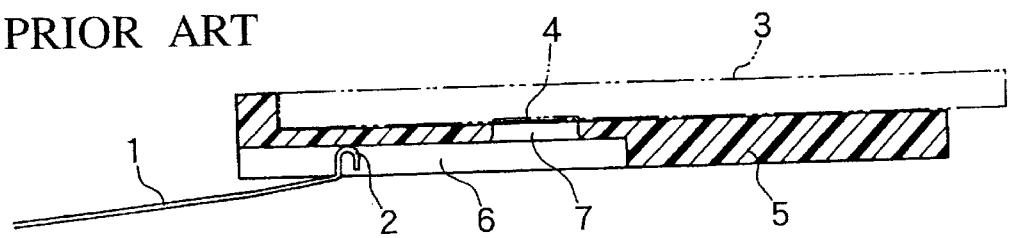
FIGS. 2(A)–2(B) are sectional views showing another conventional contacting construction between a card and a contact comparable with the present invention.
Figure 2B:
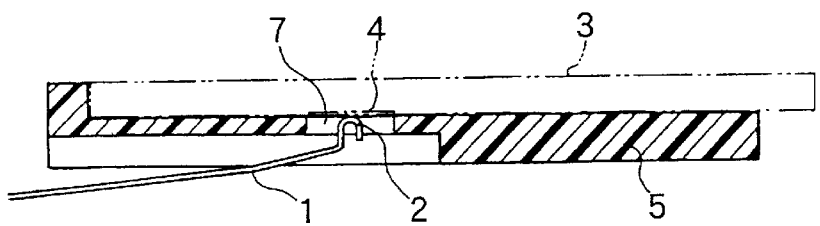

Further, it is no longer required to cause, as shown in FIG. 2(B), the contact portions to be resiliently contacted with the bottom surface of the contact guide groove of the slider to preload a resilient force while in a standby position. Owing to this arrangement, resilient deficiency of the contacts can assuredly be prevented.

According to the present invention, while achieving the above-mentioned effects, a wiping effect can be obtained by generating a sliding friction between the contact portions and the electrode pads until the insertion of the card is completed by causing the contact portions to be contacted under pressure with the corresponding electrode pads of the card immediately before the completion of insertion of the card. Thus, a reliable contacting relation can be established.

Although the present invention has been described in its preferred form with a certain degree of particularity, it is understood that the present disclosure of the preferred form has been made only by way of example and that numerous changes in the details of construction and arrangement of parts may be resorted to without departing from the spirit and the scope of the invention as hereinafter claimed.

What is claimed is:

1. A card contacting construction for use in contacting with a card having electrodes, comprising:

a connector body having a card insertion chamber into which the card can be inserted along a card insertion path;

a plurality of resilient contacts, each of said resilient contacts including a fixing portion fixed to said connector body and a contact portion disposed in said card insertion chamber and resiliently connected to said fixing portion for movement relative to said fixing portion toward and away from the card insertion path;

a floating member supported on said resilient contacts in such a manner that, when said floating member moves away from the card insertion path, said contact portions of said resilient contacts are also moved away from the card insertion path; and wherein said floating member is arranged along the card insertion path such that, upon insertion of the card into said card insertion chamber along the card insertion path, said floating member is moved by the card away from the card insertion path such that said contact portions of said resilient contacts are in turn moved away from the card insertion path against a restoring force of said resilient contacts.

2. A card contacting contact according to claim 1, wherein said floating member includes a guide surface inclined relative to the card insertion path so as to be pressed against by a front edge of the card when the card is inserted into said card insertion chamber.

3. A card contacting contact according to claim 1, wherein said floating member is supported by said resilient contacts.

4. A card contacting contact according to claim 1, wherein said floating member is supported by a spring member other than said resilient contacts.

5. A card contacting contact according to claim 4, wherein said spring member comprises a resilient spring arm fixed to said connector body.

6. A card contacting contact according to claim 5, wherein said resilient spring arm is formed as one piece with said connector body.

7. A card contacting contact according to claim 1, wherein said contact portions of said contacts are resiliently connected to said fixing portions of said contacts in such a manner that said contact portions, and said floating member supported on said contacts, are movable toward and away from the card insertion path in directions generally perpendicular to the card insertion path.

8. A card contacting contact according to claim 1, wherein each of said contacts further comprises a resilient elongated piece connecting said contact portion to said fixing portion.

9. A card contacting contact according to claim 1, wherein said floating member has at least one aperture therethrough; and said contact portions of said contacts protrude through said at least one aperture toward the card insertion path such that, when the card is inserted fully into said insertion chamber, portions of said contact portions protruding through said at least one aperture respectively contact against the electrodes of the card.

10. A card contacting contact according to claim 1, wherein said contact portions of said contacts are arranged in said insertion chamber in such a manner that, upon insertion of the card into the insertion chamber along the card insertion path, said contact portions resiliently contact the electrodes of the card immediately before completion of insertion of the card and slide along surfaces of the electrodes as insertion of the card into the insertion chamber is completed.

* * * * *